(No Model.)
E. K. JONES.
PLANT FRAME.
No. 473,756. Patented Apr. 26, 1892.
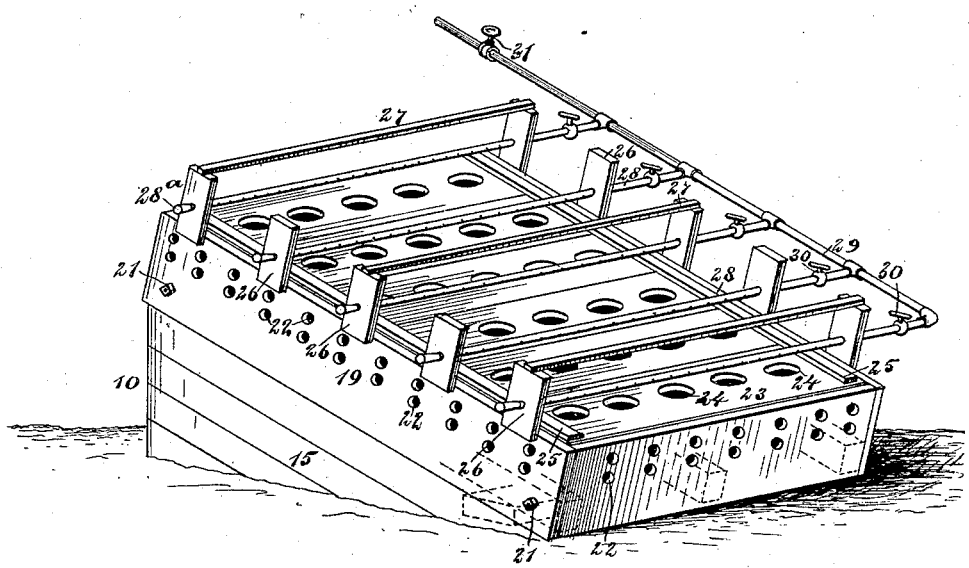
WITNESSES:
H. Walker
C. Sedgwick
INVENTOR
E. K. Jones
BY
Munn & Co
ATTORNEYS.

UNITED STATES PATENT OFFICE.

EDWARD K. JONES, OF FORT BRAGG, CALIFORNIA.

PLANT-FRAME.

SPECIFICATION forming part of Letters Patent No. 473,756, dated April 26, 1892.

Application filed October 2, 1891. Serial No. 407,531. (No model.)

*To all whom it may concern:*

Be it known that I, EDWARD K. JONES, of Fort Bragg, in the county of Mendocino and State of California, have invented a new and Improved Plant-Frame, of which the following is a full, clear, and exact description.

My invention relates to improvements in that class of frames which are adapted to hold growing plants; and the object of my invention is to produce a frame of this class which is especially adapted for strawberry culture; which is arranged so that it may be easily given the correct southern exposure; which is provided with perfect means for ventilation, irrigation, and drainage; which provides for growing a great number of plants in a comparatively small space; which causes the plants to mature rapidly and bear well, and which is constructed in such a way that the fruit is kept entirely clean.

To this end my invention consists in certain features of construction and combinations of parts, which will be hereinafter described and claimed.

Reference is to be had to the accompanying drawings, forming a part of this specification, in which similar figures of reference indicate corresponding parts in both the views.

Figure 1 is a perspective view of the frame embodying my invention, and Fig. 2 is a vertical longitudinal section of the same.

The frame is provided with an inclined base portion 10, which has at the ends cross-sills 11 and 12, the sill 11 lying flatwise upon the ground and the sill 12 being supported by posts 13, the posts being of a length to give the correct inclination to the base, and these sills are connected by top timbers 14. The sides of the base are boarded in, as shown at 15, as also are the ends, as shown at 16, and the boards on the sides project beyond the sills and are strengthened by the vertical inside strips 17. The inclined base is boarded in at the top by the transverse boards 18, and the base is adapted to support the box 19, which contains the dirt, said box being open at the top and having its bottom formed of boards 20, which are adapted to extend lengthwise of the base, and which are arranged so that the sides and ends of the box will overlap the base. The entire device is strengthened by cross-bolts 21, which extend through the lower portion of the box and through the base.

The box 19 is provided with perforations 22 in the sides and end, which perforations come opposite the dirt-holding portion of the box and through which plants may grow, and the bottom of the box is also perforated, as shown at 22ª in Fig. 2, the perforations being made at the lower end, so that the water may drain off through them. The box is provided with a loose cover 23, in which are arranged at suitable intervals holes 24, through which the plants grow, and the cover is provided at the sides with strengthening-cleats 25, as best shown in Fig. 1. On opposite sides of the box are vertical supports 26, the supports on the sides being placed exactly opposite each other, and the supports may be strengthened by top braces 27.

Extending transversely through the supports are perforated pipes 28, which at one end are closed by suitable plugs 28ª, by removing which the sediment may be washed out of the pipes, and which at the other end connect with a supply-pipe 29, which may connect with any suitable source of water-supply. Each cross-pipe 28 is provided with a stop-cock 30, by means of which the flow of water through it may be regulated, and the supply-pipe is provided with a valve 31, by means of which the entire water-supply may be cut off.

The frame is arranged so as to have a southern exposure. It is filled with rich earth. The plants are set out so as to project through the holes 24 in the cover, and then are properly watered by allowing the water to flow through the pipes above the cover, and this water will cause the cover to be thoroughly saturated, and the water will trickle down through the soil, so as to thoroughly moisten it. After the frame has been once thoroughly moistened but little water will be necessary to keep it moist.

It will be noticed that when strawberries are grown in my frame the fruit will be protected from getting gritty or sandy, since it will rest on the cover instead of on the soil. Moreover, when the water is turned on this combined cover and fruit-protector 23 will also prevent the soil from being washed away and from being spattered over the ripening fruit.

The top braces 27, while serving to strengthen the frame, also provide means for covering the entire frame in cold weather, and this is their most essential function. The soil may be enriched by means of liquid fertilizers, and it will be readily seen that there is no chance for weeds to grow, and that consequently the plants will get the full benefit of the fertilizer and will grow very rapidly.

Having thus fully described my invention, I claim as new and desire to secure by Letters Patent—

1. A plant-frame provided with a soil-receptacle having a cover and fruit-protector provided with plant-openings through which the plants may project, the space between the several openings being adapted to prevent the washing away of the soil and the spattering thereof upon the plants and fruit, substantially as set forth.

2. A plant-frame comprising an inclined soil-receptacle provided with side and bottom apertures, and a combined cover and protector having a series of plant-openings through which the plants may project, the space between the several openings serving to prevent the soil from being washed away or spattered on the plants and fruit, substantially as set forth.

3. The combination, with the soil-receptacle having a cover and protector provided with plant-openings through which the plants project, of perforated watering-pipes supported above said cover and protector, the latter serving to prevent the discharge from the pipes from washing away the soil or spattering it on the plants and fruit, substantially as set forth.

EDWARD K. JONES.

Witnesses:
GORDON E. DAVIS,
THOMAS GIBSON.